United States Patent [19]

Beebe

[11] Patent Number: 5,669,327

[45] Date of Patent: Sep. 23, 1997

[54] BIODEGRADABLE TRAIL MARKER SYSTEM

[76] Inventor: Richard W. Beebe, 1089 Starr Rd., Cortland, N.Y. 13045

[21] Appl. No.: 654,851

[22] Filed: May 29, 1996

[51] Int. Cl.⁶ .............................. G09F 3/00; G09F 17/00
[52] U.S. Cl. .................................................. 116/209
[58] Field of Search ...................... 40/316, 666; 116/209

[56] References Cited

U.S. PATENT DOCUMENTS

| | | | |
|---|---|---|---|
| 2,605,566 | 8/1952 | DeDell, Jr. ........................ | 40/316 X |
| 2,847,774 | 8/1958 | Brooks .................................. | 40/666 |
| 3,323,117 | 5/1967 | Mason ................................ | 116/209 X |
| 3,685,482 | 8/1972 | Ryder ................................. | 116/209 |
| 4,300,469 | 11/1981 | Huwe . | |
| 4,379,372 | 4/1983 | Alexander et al. . | |
| 4,742,796 | 5/1988 | Halsey ............................... | 116/209 |

FOREIGN PATENT DOCUMENTS 2678097  12/1992  France ............................... 40/666

OTHER PUBLICATIONS

*Biodegradable Polymers and Packaging,* Technomic Publishing Co., Inc., 1993, edited by Chauncey Ching, PhD.

*The Three Stages in Degradation of Polymers–Polyethylene as a Model Substance* by Ann–Christine Albertson and Sigbritt Karlsson, Journal of Applied Polymer Science, Vo. 36, 1988.

*Primary Examiner*—William A. Cuchlinski, Jr.
*Assistant Examiner*—Willie Morris Worth
*Attorney, Agent, or Firm*—Harris Beach & Wilcox,LLP

[57] ABSTRACT

A system for marking trails including a visible tag having a unitary body of a planar configuration. The tag is made of a highly visible color with the body of the tag being made of a biodegradable plastic material. In use, a plurality of tags are fastened to foliage at regular intervals along a trail to provide a series of visible markers which define the trail. The tags are retrieved for reuse after the tags have served their intended purpose.

4 Claims, 2 Drawing Sheets

BIODEGRADABLE TRAIL MARKER SYSTEM

BACKGROUND OF THE INVENTION

The present invention relates to a marker and more specifically to a biodegradable marker suitable for use in marking a trail for hikers, hunters, and the like.

The prior art teaches a wide variety of cards, tags and markers that can be used to identify location, display information or indicia, and provide direction and/or location to those utilizing these markers and cards.

U.S. Pat. No. 2,605,566 teaches a card tag which is designed to be attached to articles to identify the article or convey information or notices, etc. The card is provided with a foldable flap for locking with the body to lock the tag onto an article which has means to extend therethrough. The tag is particularly designed and adapted for use for attachment to electrical cables of electrically operated appliances.

U.S. Pat. No. 4,300,469 is directed to a marker which can be dropped from an airplane to enable the pilot of the plane to see the marker on the ground below. The marker(s) enable the pilot to identify preselected areas for spraying fertilizers, pesticides, herbicides and the like. The marker is complex in design and comprises two base members with a folded accordian-like streamer strip attached to each base member.

U.S. Pat. No. 4,379,372 is directed to a plant tag which comprises a resilient tag portion with first and second holes formed therethrough. The resilient tag is designed to lock onto the plant in a substantially permanent fixed position for ready observation by a potential purchaser.

U.S. Pat. No. 4,742,796 is directed to a fence wire location marker. The marker includes a plastic tab suitable for mounting on an electric fence wire and a brightly colored cloth-like streamer hanging from the tab. The tab is provided with a fence wire receiving opening and includes a slit from the opening to the outer edge of the tab to provide a path for mounting the marker on the wire.

While the prior art is replete with various tags and markers having a wide variety of uses, there is a need for a marker which may be used by hikers, hunters, and the like which allows a hiker or hunter to effectively mark a trail into and out of a wilderness or wooded area and provide for visual direction to the user upon returning from his journey.

It is therefore an object of the present invention to provide a trail marker and marking kit which is both reusable and biodegradable.

It is a further object of the present invention to provide a trail marker and trail marking kit which is both simple and efficient in use, and economical to manufacture.

SUMMARY OF THE INVENTION

The present invention is directed to a trail marker and trail marker kit which allows a hiker or hunter to visually mark his trail as he proceeds through the outdoors. A marker is in the form of a reusable colored tag which is made of a special biodegradable material. The tag contains means for affixing the tag to a tree limb, bush, or stem of scrub vegetation in order to visually mark the trail and allow the user to return to his original destination by visually following the markers. The markers may be spaced at any convenient interval such as 15 to 100 or more yards apart depending upon the density of the vegetation. Upon returning from the hike or journey, the user simply dislodges the previously placed markers from their fixed location. After returning to the origin of the hike, the hiker will have retrieved all of the markers which may then be reused at a later date. Alternatively, if the user desires to mark a permanent or semi-permanent trail, the markers may be left in place for future hikes depending on the intent of the user. The purpose of using a biodegradable material is to provide a marker, that in the event that all the markers are not retrieved, will eventually biodegrade. This biodegradable feature provides that after a predetermined length of time, trails marked with markers of the present invention degrade and disappear, therefore eliminating any unsightly appearance or despoilment of the landscape. In a further embodiment, the marker may be coated or contain a reflective or fluorescent material on its surface to allow the markers to be easily identified at night with a flashlight.

DETAILED DESCRIPTION OF THE INVENTION

Figure 1:
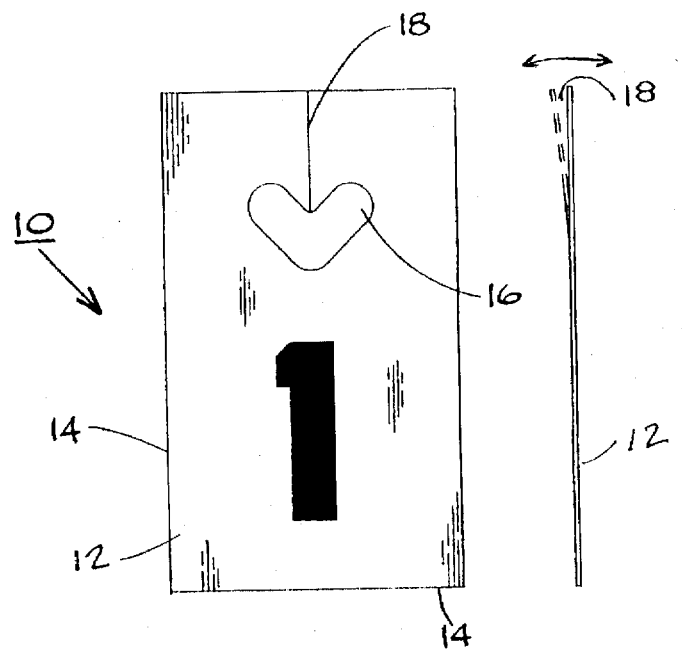
FIG. 1 is a front view of one embodiment of a trail marker of the present invention.
Figure 2:
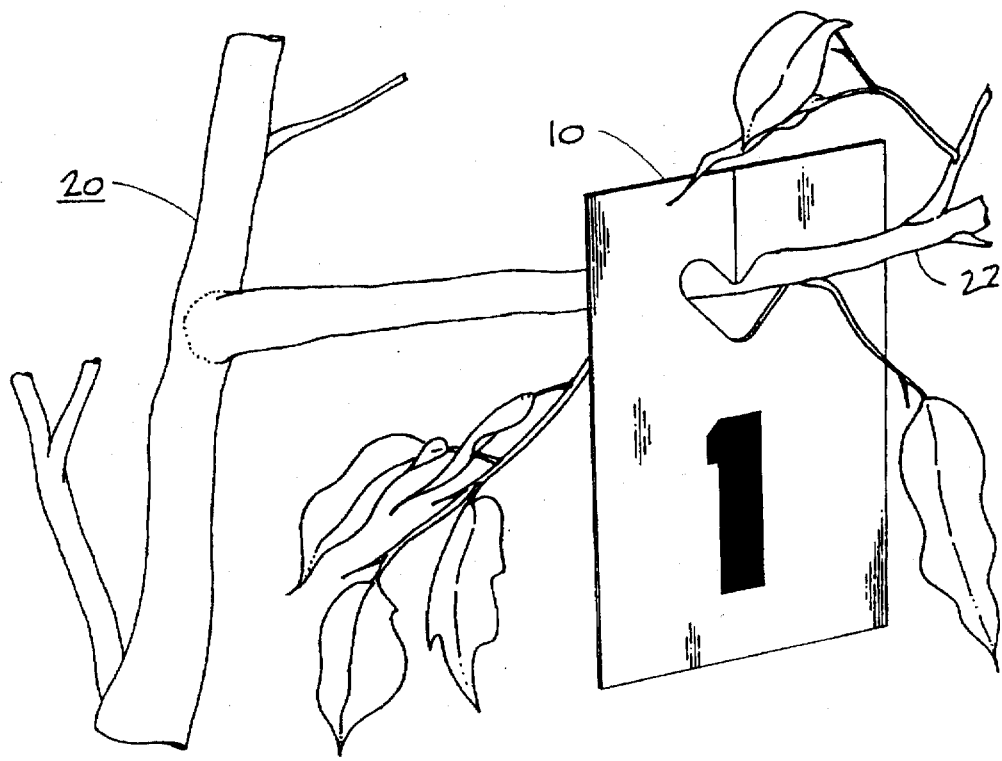
FIG. 2 is a view of a tree having a tag of the present invention mounted thereon.

Referring to FIG. 1 of the drawings, the trail marker of the present invention in one embodiment is illustrated in the form of a rectangular tag 10 having a flat planer configuration with a main body 12 in the form of a rectangle having four sides 14. The tag is provided with an opening 16 which is designed to fit around a branch or twig for mounting thereon. A slit 18 through the thickness of body 12 extends from the opening to the outer periphery of the tag in order to allow the tag to be mounted over a branch or twig 22 of tree 20. The body of the tag 12 is relatively stiff, but resiliently flexible and is made from any suitable biodegradable material which will eventually biodegrade in a predetermined amount of time when exposed to a combination of sunlight, precipitation, and/or the earth. Optionally, the tags may be numbered consecutively in order to define a trail or path as shown in FIGS. 1, 2 and 4.

Figure 4:
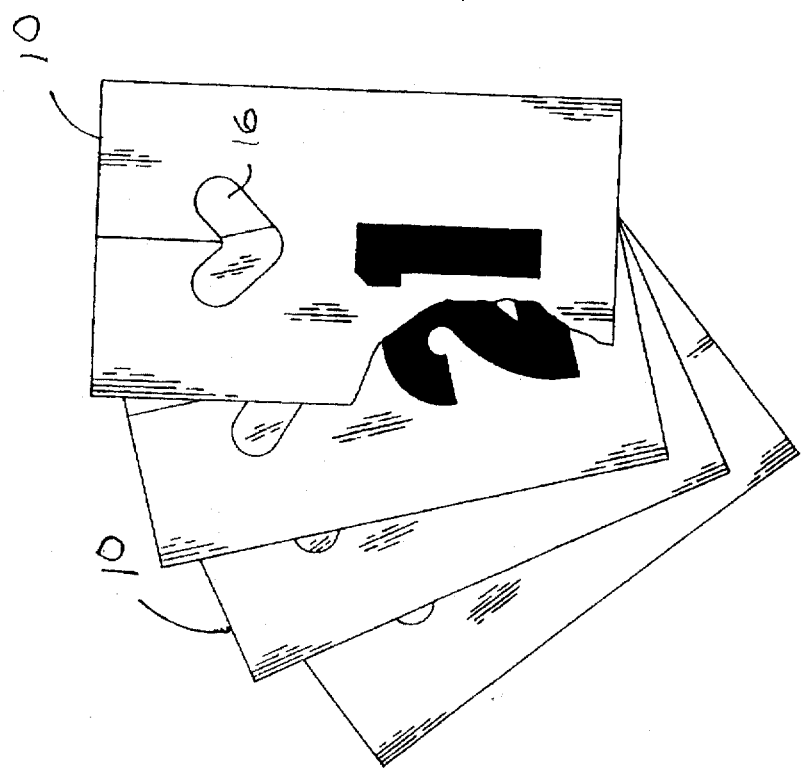
FIG. 4 illustrates a plurality of markers which are sequentially numbered.
Figure 3:
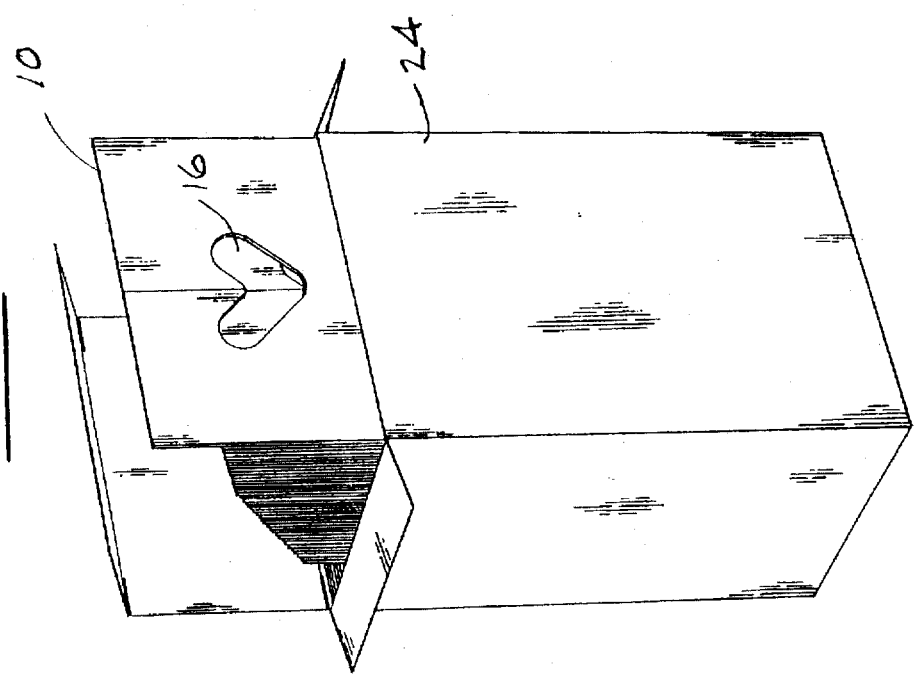
FIG. 3 is a perspective view of a box suitable for storing a plurality of markers of the present invention.

In one embodiment of the present invention, a plurality of tags 10, such as 40 or 50, in number are provided to the user in a card case or box 24 as shown in FIGS. 3 and 4. When hiking or hunting, the user affixes one card at a time to a bush or tree at selected intervals, such as illustrated in FIG. 2, to mark the user's trail.

Suitable biodegradable materials which may be used to make the tag of the present invention include biodegradable polymers such as polyethylene, cellulose acetate, polyesters and starch based materials. A more complete listing of suitable materials which may be used in making tags of the present invention is set forth in the article *Biodegradable Polymers and Packaging* published by Technomic Publishing Co., Inc., 1993, edited by Chauncey Ching, PhD. Additional biodegradable materials can also be selected from the disclosure of the article *The Three Stages in Degradation of Polymers-Polyethylene as a Model Substance* by Ann-Christine Albertson and Sigbritt Karlsson, Journal of Applied Polymer Science, Vol. 36, 1988. In a further more economical embodiment, the tag may be made .of a highly colored biodegradable paper. The paper is preferably made from paper tag stock, paperboard or other suitable biodegradable paper. A suitable paper material is 12 point (0.012"

caliper) paperboard tag stock. The paper or paperboard may also consist of multiple layers of paper/paperboard laminated to achieve desired thickness and/or stiffness.

In order to ensure that the trail marker of the present invention is visible at maximum distances, the biodegradable material is preferably dyed a bright color such as orange or yellow. Optionally, the outer surface may also contain a reflective or fluorescent material in order to allow the marker to be detected at night with a flashlight or other suitable light.

Although the present invention has been described with reference to preferred embodiments, those skilled in the art will recognize that changes may be made in form and detail without departing from the spirit and scope of the invention.

I claim:

1. A system for marking a trail which comprises:
   (a) providing a plurality of visible tags suitable for use as a trail marker, each of said tags having a unitary body of a planar configuration, said body having a highly visible color, with the body of said tag being made of at least one biodegradable material selected from the ground consisting of a starch based material, polyesters, cellulose acetate, and polyethylene, and further containing fastening means formed integrally with said body;
   (b) fastening said tags with said fastening means at regular intervals along a trail to provide a series of visual markers which define said trail, and
   (c) retrieving said tags for reuse after the tags have served their intended purpose.

2. The system of claim 1 in which the body of said tag is rectangular in shape.

3. The system of claim 1 in which the tags are sequentially numbered.

4. The system of claim 1 in which the body of the tag contains one of a reflective and fluorescent material.

* * * * *